Dec. 16, 1930.   R. KASTNER ET AL   1,785,484
PROCESS OF AND APPARATUS FOR TREATING PAPER BOARD AND THE LIKE
Filed Jan. 21, 1928   2 Sheets-Sheet 1
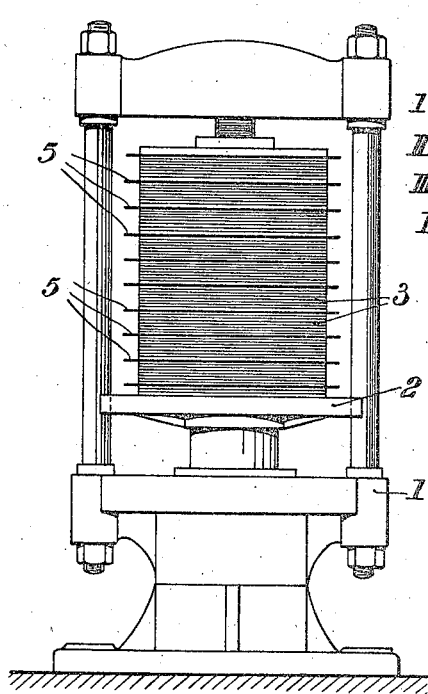
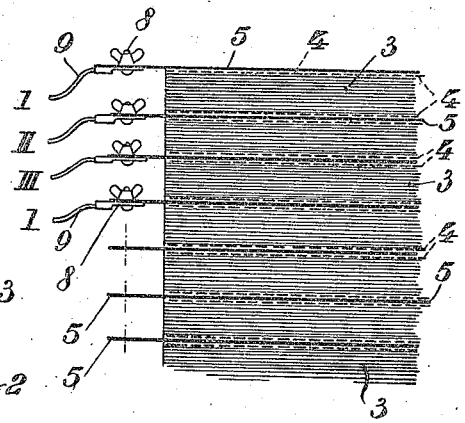
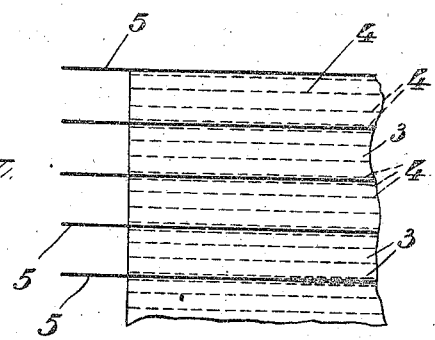
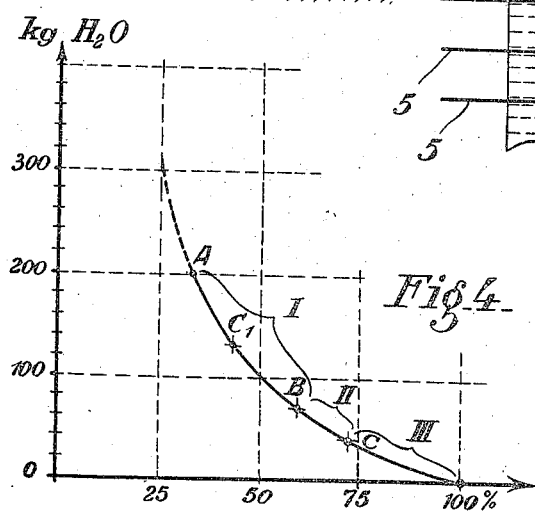
R. Kastner and
H. Schmolka
INVENTORS
By: Marks & Clerk
ATTYS.

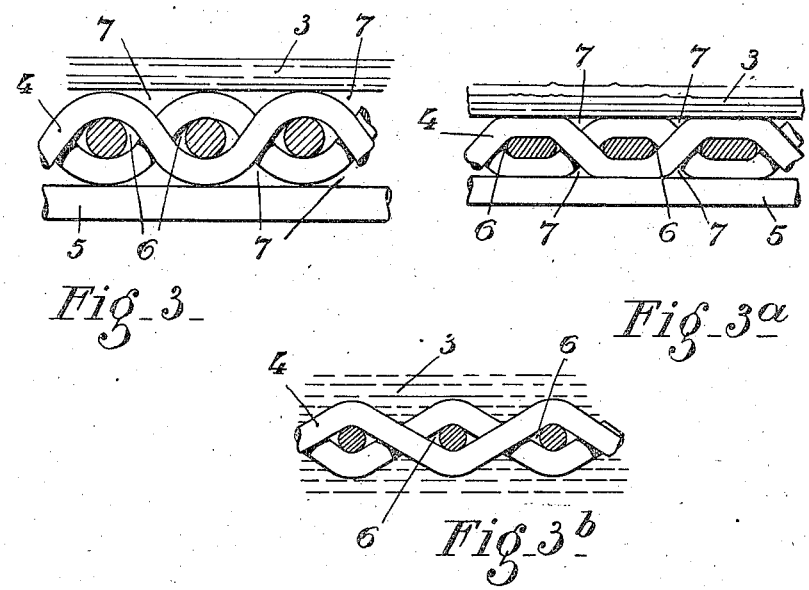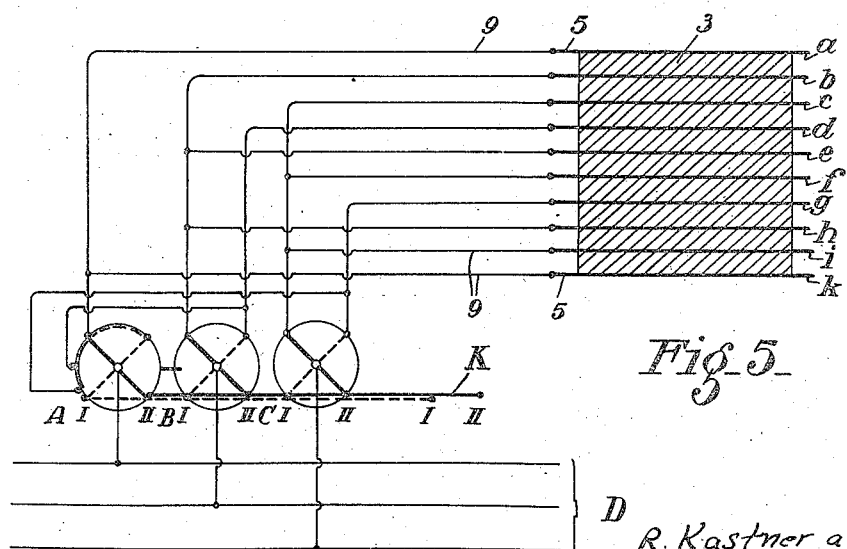

Patented Dec. 16, 1930

1,785,484

UNITED STATES PATENT OFFICE

RICHARD KASTNER, OF STEYRERMUHL, AND HERBERT SCHMOLKA, OF VIENNA, AUSTRIA

PROCESS OF AND APPARATUS FOR TREATING PAPERBOARD AND THE LIKE

Application filed January 21, 1928, Serial No. 248,450, and in Austria January 29, 1927.

The removing of water from paper-board and the like and the subsequent drying of the latter had heretofore been accomplished in such a manner that a plurality of wet sheets of paper-board coming from the paper-board machine had been piled up and subjected in such condition to a heavy pressure by means of a spindle-press or a hydraulic press, so that a part of the water had been removed. The remaining contents of water had then been removed from the paper-board by applying a separate drying process until an air-dry product had been obtained. This separate drying process had been carried out ordinarily by means of a special apparatus provided with heating and airing devices. The wet sheets in the condition as they come from the paper-board machine, consist, with reference to the air-dry condition, of about one third of paper-substance and two thirds of water. 300 kg. of wet paper-mass therefore contains 100 kg. of paper-substance and 200 kg. of water. Through pressing however it had heretofore only been possible to raise the percentage of the paper-substance in air-dry condition of the wet sheets of paper-board to about 35 to 40%, while the remaining moisture had to be removed in the subsequent drying process by supplying heat to the paper mass. There are only a few sorts of paper-board which according to the known processes may be brought to 45 to 50% of paper-substance in air-dry condition.

By the drying process according to our invention in the first place a far greater amount of water may be preliminarily withdrawn from the paper-mass by the pressing of the sheets of paper-board and in addition to this the final drying of the paper-mass is accomplished within the press. The process according to our invention, as compared with known processes, is connected with a number of advantages, which will be more fully dealt with further below. According to our invention the new process comprises in its preferred form essentially three successive steps of working. During the first step the paper-boards to be treated are solely compressed at normal temperature, in order to remove the greatest part of the watery contents of the paper-mass. During the second step of working compression of the paper-mass is continued and at the same time heat is supplied to said mass. The raise of temperature of the mass, however, has solely the effect to reduce the viscosity of the watery contents and to thereby facilitate their removal. During the third step of working according to our invention the final drying of the mass is accomplished by increasing the heat supplied to the mass, so that the watery contents of said mass will be removed therefrom partly by evaporation without taking the mass out of the press.

An essential feature of the process according to our invention consists further therein that during the pressing operation, especially during the above-mentioned two first steps of working, the pile of paper-boards is divided into relatively thin layers or packages which are separated from each other by fine wire-meshes.

In this case the arrangement is preferably made in such a manner that each layer or package of the paper-board is piled between two fine wire-meshes and that after every second or third of said layers or packages a smooth, non-perforated metal-plate is interposed between the adjacent surfaces of the wire-meshes of two successive layers or packages. The effect of these wire-meshes and also of the smooth metal-plates which are in part arranged between two meshes consists therein that the watery contents which are removed from the paper-mass by pressure may pass freely and without obstruction intermediate the meshes and the plates towards the outside. This is due to the fact that in comparison with the pressure to which the paper mass is subjected, there exists only a small pressure within the numerous interstices intermediate the meshes and the metal plates, said interstices communicating freely with the outer air. By reason of these ample channels the path of discharge of the liquid removed by compression of the mass is relatively very short, and the resistance offered to the discharge of the liquid is so small in the direction which is vertical to the surfaces of the layers or packages of the paper-board pile that the discharge will only take place in the said direction of the least resistance.

In a subsequent step of working according to our invention heat is supplied to the paper-mass, preferably by means of electric current, the wire-meshes or intermediate metal plates serving as electrodes for this purpose. The effect of such heating consists in producing a greater degree of liquidity of the watery contents of the paper mass, so that without increasing the pressure a greater quantity of the watery contents may flow out of the paper-mass. The dry contents in the paper-mass may in this manner be increased to about 70%.

Now the final drying is carried out in the same press which had been used for preliminarily removing the watery contents by pressing. For this purpose an increased amount of heat is supplied to the paper-mass for such a period of time that the paper-mass will assume a temperature of 100° C. or more, the pressure being maintained during the first part of the heating period. If now the pressure is decreased, an extensive evaporation of the water will take place within the paper-mass and the steam developed thereby may easily pass to the outside, the passage of the steam being facilitated by having the paper-mass divided into high-pressure and low-pressure sections, layers or the like separated by the wire-meshes as above mentioned. The pressure is repeatedly increased and decreased in order to discharge the remaining water in the form of steam. The paper-board pile may now be taken out of the press in fully dry condition.

The process according to this invention is connected with a further advantage consisting therein that the sheets of paper-board will no more warp as is the case if the sheets are dried separately from the press. Also the mechanical strength of the structure of the sheets of paper-board may be increased by maintaining the pressure during final drying. In addition to this, the material coherence of the paper-board may be reduced, which may be desirable for special purposes, for instance, if it is desired to produce paper-board which may be used as blotting-board or the like. This may easily be accomplished by decreasing the pressure during the third stage of the process, this having the effect that the structure of the paper-mass will be loosened and its coherence reduced by action of the steam generated in the interior of the mass.

The accompanying drawings show a practical example of the apparatus for carrying out a preferred form of the process according to this invention. In the drawings, Fig. 1 is a front view of a press serving for carrying out the new process, Figs. 2 and 2a are partial vertical sections, in an enlarged scale, through different forms of the paper-board pile, Figs. 3, 3a and 3b are vertical sections, in a still more enlarged scale, through the wire-meshes which are preferably placed intermediate the several layers of the paper-boards, Fig. 4 is a diagram representing the quantity of water which is removed during the different stages of the process according to our invention, and Fig. 5 shows a wiring diagram for an electrical heating device which may be employed according to our invention in connection with the several layers or packages of the paper-boards in the press.

For carrying out the new process, the ordinary presses which are at the present time used in practice for removing the watery contents from paper-board material may be employed. The press as represented in the drawing is assumed to be an hydraulically operated press 1 having a table 2 which serves for the reception of a pile of wet sheets of paper-board 3. The several sheets of paper-board are piled up in the form of a plurality of sections, layers or packages, an intermediate member, such as a wire-mesh or similar device being placed between the several layers or packages which may be of a thickness of 10 to 15 cm. These intermediate members, as may be seen from Fig. 2, consist preferably of a pair of wire-meshes 4, 4 and a smooth non-perforated metal-sheet or plate 5 which is placed intermediate each of said sieves. As indicated in Figs. 2a and 3b, these intermediate members may also solely consist of single wire-meshes. Preferably for this purpose waste material such as pieces of wire-mesh work may be used. These pieces consist of sieve-like textures made from fine bronze-wire. The edges of these sieves are preferably beaded or soldered together in order to provide a re-inforcement for the sieve. For removing the water from the paper-mass it is of great advantage if the sieves or similar devices are rolled-out flat in the manner shown in Fig. 3a.

Fig. 3 is a section through the sieve in its original condition, while Fig. 3a shows the same sieve after being rolled-out. It will be seen that the interstices 6 and 7 which are positioned intermediate the wires of the sieve and the plate or metal sheet 5 will be essentially reduced in size by the rolling process. These interstices or dead spaces are injurious in so far as they will be filled-up by water during pressing of the paper-board pile, said water being again absorbed by the material during a decrease of the pressure. The amount of water removed from the paper-mass will therefore depend essentially on the size of said interstices, a greater size of said interstices causing a smaller quantity of water to be removed from the paper-mass. It is evident that by subjecting the sieves to a rolling operation, said interstices may be reduced to a minimum size. Lateral discharge of the water will in this case by no means be prevented, as the cross-section of said interstices will remain sufficiently large after the rolling process.

The intermediate plates or metal sheets 5 consist preferably of zinc or iron covered with zinc. As Figs. 1 and 2 show, these plates or metal-sheets 5 project laterally from the pile of sheets of paper-board. The projecting edges of said plates or metal sheets 5 may, for instance, be provided with slots which serve for the reception of the terminals 8 of the cables 9 by means of which heating current may be supplied to said plates or metal-sheets.

According to the embodiment shown in the drawing it is assumed that three-phase alternating current is used for heating purposes. Accordingly, the number of layers or packages 3 of the paper-board is so chosen that it may be divided by three. In the present case three groups each comprising three layers or packages of paper-board are provided so that there are nine layers or packages which in the wiring diagram shown in Fig. 5 are successively designated with the reference letters a to k. The pile of sheets of paper-board, however, may also be subdivided in a different manner and more particularly a greater or smaller number of intermediate metal sheets or plates 5 may be used as electrodes in accordance with the nature and voltage of the electric current used. These intermediate metal sheets or plates may also partly be omitted so that at the respective places adjacent sections or packages of paper-board are only separated by the sieves 4. The cables 9 lead to one group of terminals of the switches A, B and C, the other group of terminals of said switches being connected to the three-phase alternating current source D. The mode of connecting the metal-sheets or plates which form the electrodes for the heating current with the terminals of the switches is shown in Fig. 5. The contact arms of the switches A, B and C are connected with each other by a common operating rod K in such a manner that upon motion of said rod said switches may be simultaneously operated.

In the position II of the switches, which position is shown in full lines, every individual electrode or plate is connected with the current source, while in the position I, which is shown in dotted lines in Fig. 5, only every third electrode or plate is connected with the current-source.

The two end plates, that is the uppermost and the undermost plate, forming part of the pile of paper-board are connected in single-pole manner. The heat supplied to the paper-mass may be thus regulated by throwing the switches A, B and C from the positions I into the positions II in accordance with the progress of the drying operation and the simultaneous increase of electrical resistance of the paper mass.

In practice the new process is carried out as follows: First the pile of paper-board resting on the table 2 of the press 1 is pressed at normal temperature. In initial condition the mass of paper-board which may have a total weight of 300 kg. will contain generally about 200 kg. of water. This condition is indicated in the diagram according to Fig. 4 by the point A, the ordinate of said diagram indicating the contents of water with reference to 100 kg. of air-dry paper-substance, while the abscissa indicates the contents of paper-substance (in air-dry condition) in percents of the total mass. Pressure is applied to an extent permissible in view of the mechanical strength of the pile of paper-board, said pressure being maintained for such a period of time until the contents of water will amount to about 700 kg. and the contents of dry substance to about 60% of the paper-mass. The point B in Fig. 4 indicates this condition, which is the result of the first stage of the process. The point $C_1$ in Fig. 4 indicates that condition of the paper-mass which had heretofore been obtained with the known processes. The drying process proper had heretofore been applied to the paper-mass after the same had been brought to the said condition.

After completion of the pressing operation unto the point B, the heating current is switched-in. The heating of the pile of paper-board which now takes place is preferably continued only for such a period of time that a temperature of about 70° C. is obtained. The temperature of the paper-mass should in no case reach the boiling temperature of water, since it is only desired to reduce the viscosity of the watery contents of the paper-mass. A temperature of about 70° C. has been proven to be the most preferable temperature from the point of view of economy of heat. As soon as the increase of the temperature of the paper-mass becomes appreciable, the water will again flow off without any further increase of pressure. This condition will continue as far as to the point C in Fig. 4, at which the contents of water in 100 kg. of dry material will be 43 kg. so that the paper mass contains about 70% of dry substance.

In the subsequent final drying process the temperature of the paper-mass is increased by further supplying heat thereto. More particularly, the temperature is raised to about 100-110° C. After the required temperature has been attained, the pressure acting upon the paper-mass is reduced in order to permit the steam formed within said mass to escape in lateral direction. Thereupon the pressure is again increased, this causing again a discharge of the steam contained in the loosened paper-mass. This alternating increase and decrease of the pressure exerted on the paper-mass is periodically repeated. This may be accomplished by manually operating the valve serving for the supply of pressure water to the hydraulic press. During this stage of the process the treatment of the paper-mass may be continued until the desired condition is attained for the final product in air-dry condition. The greatest economy, however, will be obtained, if the supply of heating current is interrupted prior to this condition, preferably at a time when the paper-mass contains only about 92% of paper-substance. During a decrease of the pressure exerted on the paper-mass additional evaporation and drying will take place due to the contact existing between the paper-mass and the exterior air in conjunction with the heat contained in the paper-mass, said latter heat being then almost completely utilized for the drying process.

In addition to the above-mentioned advantages the new process which moreover may be carried out also in every stage individually, has the following further advantages. According to the new process by mere action of pressure a considerable quantity of water may be removed from the paper-mass, which heretofore had to be removed by evaporation, that is by a greater consumption of heat-energy.

During the second stage of the process the removal of water takes place also in an entirely mechanical way, that is by mere action of pressure. The heat which is supplied in this stage to the paper-mass will not be consumed by evaporation of the water and will remain in the paper-mass with the exception of that quantity of heat which is contained in the water flowing off. The heat may therefore be advantageously utilized in the subsequent last stage of the new process.

The new process, however, is superior to the known processes not only from the point of view of economy of heat. Of importance is also the advantage of the better utilization of existing plants, which as above mentioned may be advantageously used in the application of the new process without requiring any essential changes in the arrangement of the plant or parts thereof, and the yield of the plant may be enhanced to the double or triple amount. For carrying out the first stage of the new process, which may in many cases be sufficient if an ample quantity of steam is available for the final drying of the paper-board, it will only be necessary to procure the sieves.

In order to operate the electrical heating device, only simple switching instrumentalities will be required, together with electrical connections for the metal-sheets or plates which will serve as electrodes. The heating device may also be supplied with current by means of a transformer having a plurality of steps of transformation or by means of a generator. The heat-energy which according to the present process is supplied to the paper-mass may be utilized to the fullest possible extent.

Also the uniformity of the distribution of the heat throughout the paper-mass and therewith the uniformity of the drying process is an ideal one, and the quality of the product obtained by the new process will be considerably improved. The internal structure of the paper-board will be rendered more uniform and the sheets of paper-board will leave the press in entirely plane and smooth condition. The net-like appearance of the surfaces of the paper-board due to the wire-meshes is of no disadvantage and will give the paper-board the appearance of a texture, which may often be desirable. For many purposes also satining may be dispensed with which is ordinarily used for the sheets of paper-board after completed drying.

The uniformity of the drying process will also be essentially enhanced by the use of the wire-meshes, which are interposed between the several layers or packages of the paper-board, these meshes having the effect of establishing a communication between the most interiorly located points of the paper-mass and the exterior air. By this also the pressure which is exerted upon the paper-mass will be most evenly distributed throughout the mass, while with the known processes the pressure is considerably increased towards the interior of the mass. The more uniform distribution of the pressure is also of great importance in order to use a higher pressure which is desirable for an efficient and quick removal of the watery contents from the paper-mass. With the known processes the pressure is limited because it must be so chosen that the paper-substance will not be crushed and carried away by the water flowing off.

When carrying out the process according to the invention there exists uniformity of pressure throughout the cross-section of the paper-mass independently of the amount of pressure applied thereto. The removal of water by pressure will thus further be accelerated by the new process. The two first stages of the new process will together only require about one and a half hours as compared with three or four hours which are required for removing the water from the paper-board pile according to the usual process.

It is known to subject wood pulp or the like in the form of layers to a pressing operation between coarse wire grates having large interstices. This process, however, is of no importance for removing water from a material, since the relatively large meshes or interstices of the wire-nets or perforated plates or the like will be completely filled up during the operation of pressing, and consequently no channels will be produced in a direction transverse to the pressure.

A process of pressing had been devised some years ago, wherein perforated metal-sheets provided with intermediate spaces are employed. The said means are not adapted for the present purposes. In the said process the water will certainly be pressed through the perforations and may flow off in lateral direction. But in consequence of the pressure exerted on the pile, the paper-mass will enter the intermediate space of the metal-sheets through the perforations thereof, this causing an extensive deformation of the mass of the paper-board.

In order to attain a more effective removal of the watery contents of the paper-mass frequently sections or pieces of fabric are used as intermediate layers. These fabrics, however, will easily assume the structure of felt and as far as the removal of water from the paper-mass is concerned, will not have another effect than the paper-mass itself, especially if higher pressures are employed. Such fabrics will solely have the effect of increasing the resistance of the paper-mass during pressing against strains arising in the direction transversely to the pressing forces, which have the tendency of tearing apart said fabrics. These fabrics are subjected to excessive wear and in addition to this to soiling, so that frequent washing will be necessary. Furthermore, when employing pressing fabrics, a great number of such fabrics will always be required, because every sheet of paper-board must be enclosed by two of such pressing fabrics if the removal of water shall be appreciably improved. This large number of pressing fabrics which will permanently be subject to great wear renders the process very expensive, especially as the worn-out pieces of cloth are almost without any value. The life-time of the wire-meshes employed according to our invention, in contro-distinction to said pressing fabrics, will practically be unlimited, and no appreciable soiling will take place even in case of permanent use.

In addition to this, these wire-meshes even in case of becoming useless for the present purpose keep their value as waste-material.

The extent of the removal of the water from the paper mass may be regulated independently of the force of the pressure within wide limits by correspondingly choosing the temperature during the second stage of the process, said temperature being most efficient between 55 to 75° C. If necessary the removal of water may be carried on more extensively than had heretofore been possible with respect to the highest permissible pressure.

The thickness of the above mentioned layers or packages of the paper-board may be chosen as desired. In general removal of the water from the paper mass will be the more facilitated, the smaller the thickness of the layers or packages is chosen. The paper-board pile should therefore be subdivided into as many layers or packages as permissible without unduly increasing the expenditure for manual labour required for building up the pile sheets and for taking the several layers or packages apart. At the same time the expenses which are caused in connection with the employment of a greater number of wire-meshes should be properly considered.

When using the term "contents of air-dry matter" or the like we mean the contents of air-dry paper substance in the mass of paper-board which is treated in the press. Paper-board containing 12% of water is designated as air-dry, so that a material of 50% "contents of air-dry matter" contains $$50 \cdot \frac{100-12}{100} = 44\%$$

of absolutely dry paper-board substance and 56% of water.

We claim:—

1. A process for removing water from wet sheets of pasteboard and the like, which consists in forming a pile of the sheets, subjecting the pile of sheets to mechanical pressure at ordinary temperature so as to remove a portion of the water therefrom, passing electric alternating current through the sheets while the pile is subjected to pressure so as to supply heat to the pile so as to reduce the viscosity of the water remaining therein, allowing a further quantity of water to flow off from the pile of sheets without increasing the pressure, increasing the supply of heat to the pile so as to raise the temperature of the sheets and then reducing the pressure, as and for the purposes set forth.

2. A process for removing water from wet sheets of pasteboard and the like, which consists in forming a pile of the sheets, subjecting the pile of sheets to mechanical pressure at ordinary temperature so as to remove a portion of the water therefrom, passing electric alternating current through the sheets while the pile is subjected to pressure so as to supply heat to the pile so as to reduce the viscosity of the water remaining therein, allowing a further quantity of water to flow off from the pile of sheets without increasing the pressure, increasing the supply of heat to the pile so as to raise the temperature of the sheets and alternately reducing and restoring the pressure applied to the pile of sheets, as and for the purposes set forth.

In testimony whereof we affix our signatures.

RICHARD KASTNER.
HERBERT SCHMOLKA.